(12) United States Patent
Leblanc et al.

(10) Patent No.: US 12,553,795 B2
(45) Date of Patent: Feb. 17, 2026

(54) DEVICE FOR CALIBRATING A FIBER OPTIC SENSOR AND ASSOCIATED METHOD, SENSOR AND BEARING DEVICE

(71) Applicant: Aktiebolaget SKF, Gothenburg (SE)

(72) Inventors: James P. Leblanc, Luleå (SE); Stig Robert Selberg, Luleå (SE); Stijn Van Eesbeek, GT Doorn (NL)

(73) Assignee: Aktiebolaget SKF, Gothenburg (SE)

( * ) Notice: Subject to any disclaimer, the term of this patent is extended or adjusted under 35 U.S.C. 154(b) by 402 days.

(21) Appl. No.: 18/113,530

(22) Filed: Feb. 23, 2023

(65) Prior Publication Data

US 2023/0296476 A1 Sep. 21, 2023

(30) Foreign Application Priority Data

Mar. 15, 2022 (DE) .......................... 102022202533.4

(51) Int. Cl.
*G01M 13/04* (2019.01)
*G01L 1/24* (2006.01)
*G01L 25/00* (2006.01)

(52) U.S. Cl.
CPC ............ *G01M 13/04* (2013.01); *G01L 1/246* (2013.01); *G01L 25/00* (2013.01)

(58) Field of Classification Search
None
See application file for complete search history.

(56) References Cited

U.S. PATENT DOCUMENTS

| | | | | |
|---|---|---|---|---|
| 7,573,021 | B2 * | 8/2009 | Haber ................ | G01D 5/35316 250/221 |
| 7,576,840 | B2 * | 8/2009 | Yamamoto ............. | G01K 11/32 356/73.1 |
| 10,363,101 | B2 * | 7/2019 | 'T Hooft ................ | A61B 34/20 |
| 10,935,399 | B1 * | 3/2021 | Provenzano ............ | G01L 1/242 |
| 11,022,717 | B2 * | 6/2021 | Ohanian, III ........... | G01L 1/243 |
| 11,193,751 | B2 * | 12/2021 | Froggatt ............ | G01B 9/02072 |

\* cited by examiner

*Primary Examiner* — Peter J Macchiarolo
*Assistant Examiner* — Jermaine L Jenkins
(74) *Attorney, Agent, or Firm* — GARCIA-ZAMOR INTELLECTUAL PROPERTY LAW, LLC; Ruy Garcia-Zamor

(57) ABSTRACT

The device (2) for calibrating a fiber optic sensor in a bearing device (1), comprises an optical fiber (3) including a set (6) of refraction gratings configured to identify the optical fiber (3), the device comprising:
an optical interrogator (7) configured to emit an optical signal into the optical fiber (3),
collecting means (9) for collecting the reflected wavelength of each refraction grating illuminated by the optical signal,
first processing means (10) to process the collected reflected wavelengths of the set (6) of refraction gratings to identify the optical fiber (3), and
second processing means (11) to associate the identified optical fiber (3) with a calibration data table of the said fiber optic sensor.

15 Claims, 2 Drawing Sheets

DEVICE FOR CALIBRATING A FIBER OPTIC SENSOR AND ASSOCIATED METHOD, SENSOR AND BEARING DEVICE

BACKGROUND

The present invention is directed to a device and a method for calibrating a sensor in a bearing device.

More particularly, the invention deals with the calibration of fiber optic sensor FOS implemented in a bearing device generally to measure loads acting on the bearing device.

The FOS sensor generally includes fiber Bragg grating FBG to measure the load.

Calculating means are used to calculate the loads applied on the bearing device from the FBG measurements.

In order to accurately calculate the loads, the calculating means use calibration data tables.

Due to a variety of manufacturing variations, the bearing device has unique characteristics.

Thus, the calculating means associate the FOS in the bearing device to the adapted calibration table.

It is known to pair manually the bearing device and the adapted calibration table.

However, associating a wrong calibration table to the bearing device leads to incorrect load interpretation.

SUMMARY

Consequently, the present invention intends to make reliable the matching between the FOS implemented in the bearing device and the adapted calibration table.

According to an aspect, a method for calibrating a fiber optic sensor in a bearing device is proposed.

The method comprises:
coupling an optical fiber of the fiber optic sensor to an optical interrogator, the optical fiber comprising a set of refraction gratings configured to identify the optical fiber,
emitting an optical signal into the optical fiber by the optical interrogator,
collecting the reflected wavelength of each refraction grating illuminated by the optical signal,
processing the collected reflected wavelengths of the set of refraction gratings to identify the optical fiber, and
associating the identified optical fiber with a calibration data table of the said fiber optic sensor.

The calibration data pertaining to the optical fiber are associated with the bearing device after identifying the fiber optic sensor connected to the optical interrogator so that no manual pairing operation is performed avoiding a mismatching between the fiber optic sensor and the calibration data.

The set of refraction gratings may comprise a set of Bragg refraction gratings.

Preferably, emitting an optical signal comprises generating a broadband light signal and illuminate the set of refraction gratings with the generated broadband light signal.

Advantageously, processing the collected reflected wavelengths comprises decoding the collected reflected wavelengths to determine an optical fiber digital data indicative of the identity of the optical fiber.

Preferably, the step of associating comprises:
comparing the optical fiber digital data with a plurality of reference digital data, each reference digital data being associated to a unique calibration data, and
selecting the calibration data associated to the reference digital data matching the optical fiber digital data to calibrate the fiber optic sensor.

According to another aspect, a device for calibrating a fiber optic sensor in a bearing device is proposed.

The device comprises an optical fiber including a set of refraction gratings configured to identify the optical fiber, the device comprising:
an optical interrogator configured to emit an optical signal in the optical fiber,
collecting means for collecting the reflected wavelength of each refraction grating illuminated by the optical signal,
first processing means to process the collected reflected wavelengths of the set of refraction gratings to identify the optical fiber, and
second processing means to associate the identified optical fiber with a calibration data table of the said fiber optic sensor.

Advantageously, the first processing means is configured to determine optical fiber digital data indicative of the identity of the optical fiber.

Preferably, the second processing means is configured to:
compare the optical fiber digital data with a plurality of reference digital data, each reference digital data being associated to a unique calibration data, and
select the calibration data associated to the reference digital data matching the optical fiber digital data to calibrate the fiber optic sensor.

Advantageously, the device further comprises a database comprising a plurality of calibration data, each calibration data being associated to a reference digital data.

According to another aspect, a fiber optic sensor for bearing device comprising an optical fiber and a device as defined above is proposed.

The optical fiber comprises a set of refraction gratings configured to identify the optical fiber, the optical interrogator being connected to the optical fiber.

According to another aspect, a bearing device comprising a fiber optic sensor as defined above coupled to one of the rings of the bearing is proposed.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiment of the invention, which are non-limiting example, illustrated on the appended drawing of which.

DETAILED DESCRIPTION OF THE INVENTION

Figure 1:
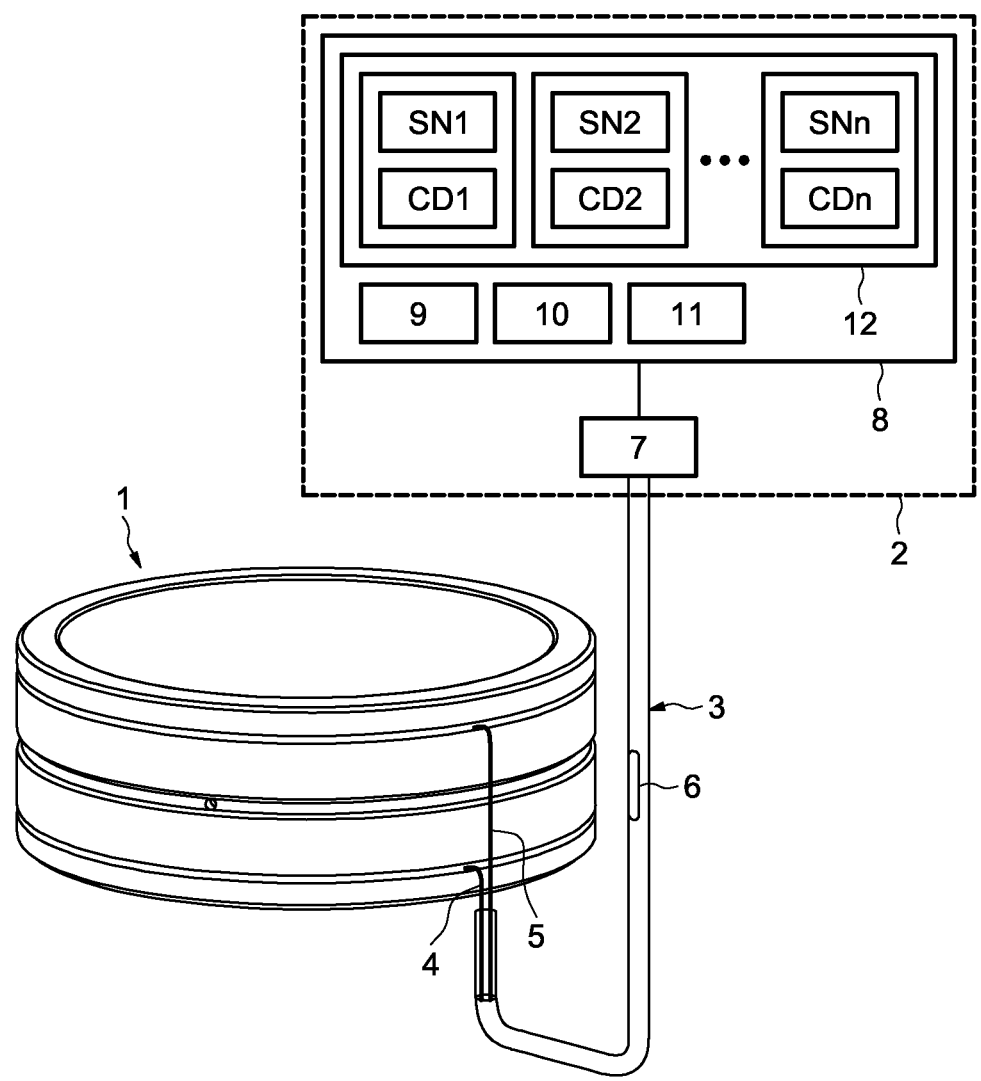
FIG. 1 illustrates schematically a bearing device according to the invention.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Reference is made to FIG. 1 which represents schematically a bearing device 1 comprising a fiber optic sensor FOS and a device 2 for calibrating the fiber optic sensor. The fiber optic sensor is mounted on one of the rings of the bearing, here the outer ring.

The fiber optic sensor comprises an optical fiber 3 comprising an optical cable and two optical fibers 4, 5 surrounding the bearing.

The optical fiber 2 incorporates at least one optical sensor.

Of course, there may be one or more optical fibers. The number of optical fibers depends on the desired value accuracy of a first parameter to be measured in the bearing.

The optical sensor comprises for example fiber Bragg gratings acting as an optical strain gauge to measure strains acting on the bearing device 1.

The optical fiber 3 comprises a set 6 of refraction gratings.

The set 6 encodes optical fiber digital data indicative of the identity of the optical fiber 3 permitting to identify the FOS.

The set 6 of refraction gratings is dedicated for optical fiber identification purposes.

The set 6 is manufactured in the fiber 3 using for example a laser or phase mask techniques.

The optical fiber digital data comprise for example a serial number of the optical fiber 3.

The set 6 of refraction gratings may comprise a set of Bragg refraction gratings.

The optical fiber digital data may further comprise the date of manufacture of the sensor, the version number of the sensor.

The device 2 comprises an optical interrogator 7 and a processing module 8 connected to an output of the optical interrogator 7.

The optical interrogator 7 further comprises an input connected to the optical fiber 3.

The processing module 8 comprises collecting means 9, first processing means 10, second processing means 11, and a database 12.

The database 12 comprises a plurality of calibration data CD1, CD2 . . . . CDn, each calibration data being associated to a reference digital data comprising for example serial numbers SN1, SN2 . . . . SNn of optical fibers, n being an integer.

For example, the serial number SN2 is assigned to the optical fiber 3.

Figure 3:
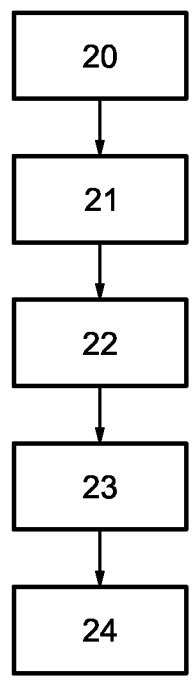
FIG. 3 illustrates schematically an example of a method for calibrating a fiber optic sensor according to the invention.

FIG. 3 illustrates schematically an example of the fiber optic sensor.

The fiber optic sensor comprises a detection cell 13 connected to the optical fiber 3.

The detection cell 13 is provided in the bearing device 1.

Figure 2:
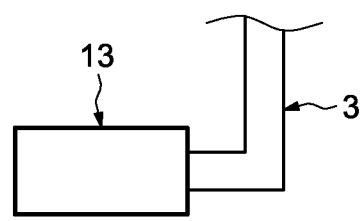
FIG. 2 illustrates schematically an example of a fiber optic sensor according to the invention.

FIG. 2 illustrates an example of a method for calibrating the fiber optic sensor implementing the device 2.

In a step 20, the fiber 3 is coupled to the optical interrogator 7.

In step 21, the optical interrogator 7 emits an optical signal in the optical fiber 3 to illuminate the set 6.

The optical interrogator 7 generates for example a broadband light signal so that each refraction grating reflects a wavelength and illuminate the set of refraction gratings with the generated broadband light signal.

The optical interrogator 7 comprises for example a laser device.

In step 22, the collecting means 9 collect the reflected wavelength of each individual refraction grating of the set 6.

The collecting means 9 are for example formed by the optical interrogator 7.

In step 23, the first processing means 10 process the reflected wavelength of each individual refraction grating of the set 6 collected by the collecting means 9 to identify the optical fiber digital data comprising the serial number SN2.

The first processing means 10 comprise for example a processing unit to decode the collected reflected wavelengths.

Then, in step 24, the second processing means 11 associate the identified optical fiber 3 with a calibration data table of the said fiber optic sensor.

the second processing means 11 compare the serial number SN2 with the plurality of reference digital data SN1, SN2 . . . . SNn stored in the database 12 and select the calibration data CD2 associated to the serial number SN2.

The device 2 permits to choose the calibration data associated with the bearing device after identifying the fiber optic sensor connected to the optical interrogator, from example from the serial number of the fiber 3.

No manual pairing operation is performed so that a mismatching between the fiber optic sensor and the calibration data is reduced.

The invention claimed is:

1. A method for calibrating a fiber optic sensor in a bearing device comprising:
    coupling an optical fiber of the fiber optic sensor to an optical interrogator, the optical fiber comprising a set of refraction gratings configured to identify the optical fiber,
    emitting an optical signal into the optical fiber by the optical interrogator,
    collecting the reflected wavelength of each refraction grating illuminated by the optical signal,
    processing the collected reflected wavelengths of the set of refraction gratings to identify the optical fiber, and
    associating the identified optical fiber with a calibration data table (CD1, CD2, CDn) of the said fiber optic sensor.

2. The method of claim 1, wherein emitting an optical signal comprises generating a broadband light signal and illuminate the set of refraction gratings with the generated broadband light signal.

3. The method of claim 1, wherein processing the collected reflected wavelengths comprises decoding the collected reflected wavelengths to determine an optical fiber digital data indicative of the identity of the optical fiber.

4. The method of claim 3, wherein the step of associating comprises:
    comparing the optical fiber digital data with a plurality of reference digital data (SN1, SN2n, SNn), each reference digital data being associated to a unique calibration data (CD1, CD2, CDn), and
    selecting the calibration data (CD1, CD2, CDn) associated to the reference digital data (SN1, SN2n, SNn) matching the optical fiber digital data to calibrate the fiber optic sensor.

5. A device for calibrating a fiber optic sensor in a bearing device, comprising an optical fiber including a set of refraction gratings configured to identify the optical fiber, the device comprising:
    an optical interrogator configured to emit an optical signal in the optical fiber,
    collecting means for collecting the reflected wavelength of each refraction grating illuminated by the optical signal,
    first processing means to process the collected reflected wavelengths of the set of refraction gratings to identify the optical fiber, and
    second processing means to associate the identified optical fiber with a calibration data table of the said fiber optic sensor.

6. The device of claim 5, wherein the first processing means is configured to determine optical fiber digital data indicative of the identity of the optical fiber.

7. The device of claim 5, wherein the second processing means is configured to:
    compare the optical fiber digital data with a plurality of reference digital data (SN1, SN2, SNn), each reference digital data being associated to a unique calibration data (CD1, CD2, CDn), and
    select the calibration data associated to the reference digital data matching the optical fiber digital data to calibrate the fiber optic sensor.

8. The device of claim 7, further comprising a database comprising a plurality of calibration data (CD1, CD2, CDn), each calibration data being associated to a reference digital data (SN1, SN2, SNn).

9. A fiber optic sensor for bearing device comprising an optical fiber and a device according to claim 5, the optical fiber comprising a set of refraction gratings configured to identify the optical fiber, the optical interrogator being connected to the optical fiber.

10. A bearing device comprising a fiber optic sensor according to claim 9 and coupled to one of the rings of the bearing.

11. The method of claim 2, wherein processing the collected reflected wavelengths comprises decoding the collected reflected wavelengths to determine an optical fiber digital data indicative of the identity of the optical fiber.

12. The device of claim 6, wherein the second processing means is configured to:
    compare the optical fiber digital data with a plurality of reference digital data (SN1, SN2, SNn), each reference digital data being associated to a unique calibration data (CD1, CD2, CDn), and
    select the calibration data associated to the reference digital data matching the optical fiber digital data to calibrate the fiber optic sensor.

13. A fiber optic sensor for bearing device comprising an optical fiber and a device according to claim 6, the optical fiber comprising a set of refraction gratings configured to identify the optical fiber, the optical interrogator being connected to the optical fiber.

14. A fiber optic sensor for bearing device comprising an optical fiber and a device according to claim 7, the optical fiber comprising a set of refraction gratings configured to identify the optical fiber, the optical interrogator being connected to the optical fiber.

15. A fiber optic sensor for bearing device comprising an optical fiber and a device according to claim 8, the optical fiber comprising a set of refraction gratings configured to identify the optical fiber, the optical interrogator being connected to the optical fiber.

* * * * *